United States Patent [19]

Kingsbury

[11] 3,916,049

[45] *Oct. 28, 1975

[54] SOUND DEADENING AND MATERIALS THEREFOR

[75] Inventor: Herbert William Kingsbury, Chislehurst, England

[73] Assignee: British Uralite Limited, Rochester, England

[*] Notice: The portion of the term of this patent subsequent to Nov. 26, 1991, has been disclaimed.

[22] Filed: Aug. 27, 1974

[21] Appl. No.: 500,867

Related U.S. Application Data

[63] Continuation-in-part of Ser. No. 266,127, June 26, 1972, Pat. No. 3,850,789.

[30] Foreign Application Priority Data

June 28, 1971 United Kingdom............... 30204/71

[52] U.S. Cl. .................. 428/35; 106/277; 106/282; 106/286; 181/.5 R; 181/336 A; 252/62; 428/114; 428/212; 428/220; 428/280; 428/443; 428/489

[51] Int. Cl.².. B32B 5/12; B32B 7/02; B32B 19/04; B32B 11/02

[58] Field of Search ........... 161/205, 236, 152, 165; 181/.5 R, 336 A; 106/277, 282, 286; 252/62; 428/35, 114, 212, 280, 220, 443, 489

[56] References Cited

UNITED STATES PATENTS

| | | | |
|---|---|---|---|
| 2,742,374 | 4/1956 | Groskopf | 161/236 |
| 3,509,008 | 4/1970 | Adomshick | 161/205 |
| 3,850,789 | 11/1974 | Kingsbury | 161/205 |

*Primary Examiner*—Marion E. McCamish
*Attorney, Agent, or Firm*—Browdy and Neimark

[57] ABSTRACT

A hollow component, and specifically a sump, timing gear cover or valve gear cover, of an internal combustion engine, said component having applied thereto over at least part of the surface thereof a sound deadening layer comprising one or more self-supporting sheets of asbestos fibre-filled bitumen composition, the total thickness of the sound deadening layer being at least 1.5 mm and wherein in each sheet the weight ratio of asbestos fibres to bitumen is in the range of from 40:60 to 60:40, and in each sheet the asbestos fibres are in the form of a plurality of discrete laminae lying parallel to the plane of the sheet.

1 Claim, No Drawings

SOUND DEADENING AND MATERIALS THEREFOR

This is a continuation-in-part application of application Ser. No. 266,127, filed June 26, 1972, having the priority date of June 28, 1971 by virtue of British application No. 30204/71, such earlier application Ser. No. 266,127 having now matured into U.S. Pat. No. 3,850,789.

This invention relates to a hollow component for an internal combustion engine, and particularly a sump, timing gear cover or valve gear cover, and is concerned with reducing the sound transmission thereof.

Increasing attention is being directed to reducing noise from internal combustion engines. Noise occurs not only as a result of the moving parts, but also as a result of sympathetic vibrations in hollow components of the engine and particularly those devised of flat or profiled thin metal or metal-substitute sheets; especially the sump, timing gear cover and valve gear cover of the engine.

By the sump (or sump cover) we mean the cover for the base of the crankcase and which usually acts also as the reservoir for the lubricant. By the timing gear cover we mean the cover for the machinery, usually a gear train or chain and sprocket drive, for driving the camshaft and/or ignition distributor from the crankshaft. This machinery and the cover therefor are usually located at the nose or rear of the engine. By the valve gear cover we mean the cover for the machinery for opening and closing the inlet and exhaust valves. This cover, sometimes also known as the rocker box cover, is usually located on top of the cylinder head. All these covers are usually made of pressed steel and are particularly prone to vibrate.

Recently, attempts have been made to reduce or absorb the noise transmission of such structures and most such attempts have been directed to discovering a suitable material which can be applied to the surface of the structure to damp the vibrations. Suitable materials not only have to be able to provide the required vibration damping over the whole range of operating conditions, particularly of temperature, but also have to resist exposure to weather and to environments such as water and oil, meet requirements as to proof against fire and flame, be able to adopt the contours of the surface of the structure either before or after application to the metal, and be economic in price.

According to the present invention, we provide a hollow component of an internal combustion engine, which component is prone to vibrate, said component having applied thereto over at least part of the surface thereof a sound deadening layer comprising one or more self-supporting sheets of asbestos fibre-filled bitumen composition, the total thickness of the sound deadening layer being at least 1.5 mm and wherein in each sheet the weight ratio of asbestos fibres to bitumen is in the range of from 40:60 to 60:40, and in each sheet the asbestos fibres are in the form of a plurality of discrete laminae lying parallel to the plane of the sheet.

Sheets of asbestos fibre-filled bitumen wherein the asbestos fibres are in the form of a plurality of discrete laminae lying parallel to the plane of the sheet may be formed, for example, by forming an aqueous suspension of short asbestos fibres and bitumen and then building up the sheet to the required thickness from layers of the suspension, e.g., for use of a board machine in a manner akin to paper- and board- making. The sheet is thereafter heated to fuse the bitumen.

The asbestos/bitumen sheets which provide the sound deadening layers in the present invention combine satisfactory vibration damping properties, which are long-lasting, with excellent resistance to environmental, fungus and termite attack. For example, the decay rate of a sheet having a thickness of about 0.090 inch and a density such as to give a weight of about 7½ ounces/sq.ft and containing about equal weights of asbestos and bitumen, has been measured by the Geiger thick plate rate test as 12db/sec when fully bonded to the plate and as high as 26db/sec when unbonded, and tests have shown that little if any deterioration of the material occurs as a result of exposure to atmosphere, even after many years. The sheets are also water-repellant, resistant to creep under normal operational conditions, and resistant to abrasion.

Furthermore, despite the high bitumen content of up to as much as 60% by weight, the sheets have an unexpextedly good performance in fire. Their burn rate in accordance with Motor Vehicle Safety Standard No. 302 of the United States of America Department of Transportation, Federal Highway Administration is NIL, and their classification in accordance with British Standard 476, Part 3, 1953, is AA.

The sheets also have the ability to be profiled in softened form without the need for complicated or sophisticated equipment such as is required for thermoforming synthetic plastics materials, and to retain their shape on subsequent re-hardening. Because they can tolerate some local overheating without discoloring or charring, they can be heat-softened for subsequent shaping by use of such unsophisticated devices as gas-air torches, and because in the softened state they are still sufficiently strong to be handled, sophisticated moulding equipment is not required. The sheets can also be softened for moulding without the application of heat, by exposing them to the vapours of a solvent for the bitumen, e.g., trichloroethylene. On subsequent removal of the absorbed solvent, e.g., by evaporation, the sheets revert to a semi-rigid self-supporting state which will retain almost indefinitely the shape imparted to them and are unexpected resilient and resistant to cracking on flexure having regard to the highly brittle nature of each of the two components on its own.

The above-mentioned combination of properties makes the sheets especially suitable for application for sound deadening purposes to the hollow components, and especially sumps (sump covers), timing gear covers and valve gear covers (rocker box covers), of internal combustion engines. Their fire resistance and resistance to atmospheric conditions allows them to be used in engine compartments; their ease of shaping precludes the need for investment in capital-intensive plant; their ability in sheet form to retain the shape imparted to them means that they can be applied to the hollow components (e.g., valve gear covers) even of complicated shape without the need for bonding which can be disadvantageous both from a practical point of view and from the point of view of optimum sound-damping effectiveness in some instances; and their resistance to cracking on flexure can be used to advantage.

The sheets are also formed from readily available and relatively inexpensive materials and compare favorably with synthetic plastics in cost.

Although the best results are most generally achieved thereby, it is not essential for the sound deadening layer to be applied directly to the external surface of the hollow component, it being acceptable if desired to interpose one or more layers of other materials, e.g., for the purposes of heat insulation, corrosion protection or further noise suppression.

It may also be desired to apply one or more layers of other material on top of the sound deadening layer, e.g., for heat insulation or further noise suppression.

An example of a material that may be interposed or superposed for additional noise suppression is a noise-absorbing felt such as is conventionally used in the motor industry. The felt is suitably from 6 to 12.5 mm thick but even thicker sections may be used in some instances, e.g., up to 100 mm.

In accordance with one aspect of the invention, the combination of hollow component and sound deadening layer may be obtained by moulding the layer to conform to the external shape of the pre-formed hollow component and placing the thus profiled layer over the hollow component. In some instances, e.g., as in the case of a rocker box cover, it may not be necessary to attach the layer to the component. In other instances, however, e.g., for sumps and timing gear covers, it will be desirable to attach, e.g., bond, the sound deadening layer to the surface of the component over part or all of the contact area.

Where a layer of other material, and especially a noise suppression material, e.g., felt, is interposed between the surface of the hollow component and the asbestos fibre-filled bitumen sound deadening layer, the latter may be bonded to the interposed layer and this interposed layer may or may not be bonded to the component surface, as desired.

Preferably, the asbestos fibre-filled bitumen sound deadening layer for use in the invention is at least 2 mm thick and suitable thicknesses for most applications are from 2 to 6 mm but even greater thicknesses may be used if desired and in some applications still greater benefits may be obtained by the use thereof.

Joining together side-by-side sheets can conveniently be effected by splicing, for which purpose the adjacent edges of the sheets to be joined are delaminated for a short distance into the sheet and the delaminated edges of the adjoining sheets then interposed with each other and pressed together. A strong joint results.

While the sound deadening properties of the asbestos fibre-reinforced bitumen composition are quite adequate, the possibility of including other materials, e.g., finely ground mineral fillers, in the sheets is not excluded provided that the weight ratio of asbestos fibres to bitumen is maintained within the range 40:60 to 60:40.

Examples of asbestos fibre-filled bitumen sheets that may be used in the invention are those marketed by British Uralite Limited under the name "Industrialite," in which there are approximately four asbestos laminae per millimetre of thickness, the asbestos fibres being of a grade in the range 6D to 4A (Quebec Standard Test) and the bitumen grade being in the range 200 PEN 30°C SP to 155°C SP 7 PEN and H110/120 SP 3 PEN (British Standard Test Method 3235) where PEN is penetration and SP is softening point.

Where it is used in a location exposed to hydrocarbon vapours, for instance in the engine compartment of an internal combustion engine, it is desirable to protect the exposed surface of the asbestos fibre/bitumen layer with an oil-resistant coating.

The invention is now illustrated by the following Example.

EXAMPLE

A 4-mm thick sheet of asbestos fibre-reinforced bitumen containing approximately equal parts by weight of asbestos and bitumen and in which the asbestos fibres were in the form of a plurality of (about 16) discrete laminae lying parallel to the plane of the sheet, was softened and moulded to take the external shape of a rocker-box (valve gear) cover, of a commercial six-cylinder diesel engine and bonded to the rocker box. Another sheet of the same structure, weight ratio of asbestos fibres to bitumen, and thickness, was laminated to a layer of glass fibre and the laminate similarly moulded by heat-softening, and subsequently bonded to the sump of the same engine with the glass fibre between the sump and the sheet. Yet another sheet having the same weight ratio of asbestos fibres to bitumen but of 2 mm thickness and containing only about eight laminae of asbestos fibres, was moulded and bonded to the front plate (timing gear cover). Excellent reduction in noise from the engine was achieved and similar results were obtained on other commercial diesel engines of the same and other manufactures and of similar and different cubic capacities and of four and six cylinders. Moreover, the mouldings were found to withstand successfully the under-bonnet conditions of engine emissions, water and salt spray, and elevated operating temperatures.

I claim:

1. A hollow component of an internal combustion engine, which component is prone to vibrate, said component having applied thereto over at least part of the surface thereof a sound deadening layer comprising one or more self-supporting sheet of asbestos fibre-filled bitumen composition, the total thickness of the sound deadening layer being at least 1.5 mm and wherein in each sheet the weight ratio of asbestos fibres to bitumen is in the range of from 40:60 to 60:40, and in each sheet the asbestos fibres are in the form of a plurality of discrete laminae lying parallel to the plane of the sheet.

2. A hollow component as claimed in claim 1 in which the exposed surface of the sound deadening layer is protected with an oil-resistant coating.

3. A hollow component as claimed in claim 1 in which the sound deadening layer is spaced from the surface thereof by at least one layer of other material.

4. A hollow component as claimed in claim 3 in which the other material is a noise suppressing material.

5. A hollow component as claimed in claim 4 in which the noise suppressing material is felt.

6. A hollow component as claimed in claim 5 in which the felt is 6 to 100 mm thick.

7. A hollow component as claimed in claim 6 in which the felt is 6 to 12.5 mm thick.

8. A hollow component as claimed in claim 1 in which at least one layer of other material is superposed on the sound deadening layer.

9. A hollow component as claimed in claim 8 in which the other material is a noise suppressing material.

10. A hollow component as claimed in claim 9 in which the noise suppressing material is felt.

11. A hollow component as claimed in claim 10 in which the felt is 6 to 100 mm thick.

12. A hollow component as claimed in claim 11 in which the felt is 6 to 12.5 mm thick.

13. A hollow component as claimed in claim 1 which is a sump for an internal combustion engine and in which the sound deadening layer is bonded to the external surface thereof.

14. A hollow component as claimed in claim 1 which is a valve gear cover for an internal combustion engine and in which the sound deadening layer is applied to the external surface thereof.

15. A hollow component as claimed in claim 1 which is a timing gear cover for an internal combustion engine and in which the sound deadening layer is bonded to the external surface thereof.

16. A hollow component as claimed in claim 1 in which the sound deadening layer is bonded to the component surface over part or all of the contact area.

17. A hollow component as claimed in claim 1 in which there is no bonding between the sound deadening layer and the component surface.

* * * * *